(12) United States Patent
Gross et al.

(10) Patent No.: US 7,134,441 B2
(45) Date of Patent: Nov. 14, 2006

(54) HIGH THROUGHPUT ULTRASONIC CLEANER FOR IRRADIATED NUCLEAR FUEL ASSEMBLIES

(75) Inventors: David Gross, Bethesda, MD (US); David Arguelles, Washington, DC (US); Brian Lipford, Bel Air, MD (US)

(73) Assignee: Dominion Engineering, Inc., Reston, VA (US)

( * ) Notice: Subject to any disclaimer, the term of this patent is extended or adjusted under 35 U.S.C. 154(b) by 167 days.

(21) Appl. No.: 10/628,559

(22) Filed: Jul. 29, 2003

(65) Prior Publication Data

US 2004/0099294 A1    May 27, 2004

Related U.S. Application Data

(60) Provisional application No. 60/398,726, filed on Jul. 29, 2002.

(51) Int. Cl.
*B08B 3/00* (2006.01)
*B08B 3/12* (2006.01)

(52) U.S. Cl. .................... 134/169 R; 134/110; 134/111

(58) Field of Classification Search ................. 134/44, 134/110, 111, 166 R, 169 R, 169 C, 166 C, 134/186; 376/308–310
See application file for complete search history.

(56) References Cited

U.S. PATENT DOCUMENTS 4,720,369 A    1/1988   Cadaureille et al.
4,828,760 A    5/1989   Chung et al.
4,930,540 A    6/1990   Oddenino et al.
5,000,207 A    3/1991   Titterington et al.
5,467,791 A    11/1995  Kato et al.
5,950,658 A    9/1999   Hoeptner, III et al.
5,964,408 A    10/1999  Musson
6,176,596 B1   1/2001   Shikla et al.
6,396,892 B1   5/2002   Frattini et al.

FOREIGN PATENT DOCUMENTS

EP    0 364 209 A    4/1990
EP    0 615 792 A    9/1994
GB    2 170 578 A    8/1986

*Primary Examiner*—Joseph L. Perrin
(74) *Attorney, Agent, or Firm*—Pillsbury Winthrop Shaw Pittman LLP

(57) ABSTRACT

A passive assembly for operating two cleaning chambers using a single filtration system having a flow diverter assembly is disclosed. The flow diverter assembly is actuated by a fuel assembly when a fuel assembly is inserted into the cleaning chamber. The flow diverter assembly acts so that each cleaning chamber is supplied with suction flow whenever there is a fuel assembly in the cleaning chamber. When a cleaning chamber is empty, the flow diverter acts to block the suction flow from the filtration system, forcing suction flow through the opposite cleaning chamber. The flow diverter only provides suction head to a cleaning chamber when there is a fuel assembly in the cleaning chamber. When both cleaning chambers are empty, suction pressure from the pump increases to the point that the flow diverters in both chambers open sufficiently to maintain flow through the pumps and prevent the pumps from cavitating.

26 Claims, 5 Drawing Sheets

HIGH THROUGHPUT ULTRASONIC CLEANER FOR IRRADIATED NUCLEAR FUEL ASSEMBLIES

CROSS REFERENCE TO RELATED APPLICATION

This application relates to and claims priority to U.S. Provisional Patent Application No. 60/398,726, entitled "High Throughput Ultrasonic Cleaner For Irradiated Nuclear Fuel Assemblies," filed on Jul. 29, 2002, which is incorporated herein by reference.

BACKGROUND OF THE INVENTION

1. Field of the Invention

The present invention relates to improvements on previous systems for ultrasonically cleaning irradiated nuclear fuel assemblies.

2. Description of Related Art

Ultrasonic energy cleaning has been successfully employed to remove crud deposits from irradiated nuclear fuel assemblies. The initial commercial motivation for removing these deposits from pressurized water reactor (PWR) fuel has been to mitigate crud induced power shift (CIPS), also sometimes referred to as axial offset (AO) or axial offset anomaly (AOA). CIPS is a phenomenon in which deposits form on the fuel rod cladding due to the combination of local thermal and hydraulic conditions and primary side fluid impurities characteristic of the reactor and primary system. Certain compounds residing in these deposits act as a poison to the nuclear reaction and, because the deposits are typically thicker in the top portion of the core, cause an abnormal power distribution along the axis of the core, reducing available margin for certain types of operating conditions. As a result of CIPS, some power plants have been forced to reduce their reactor power level and hence electrical output for extended periods, which has been expensive for the operating utilities.

In addition to mitigating CIPS, removal of crud deposits from irradiated fuel assemblies produces some other favorable results in nuclear plants of any design, including but not limited to (1) reducing the total crud inventory ("source term reduction") of plant primary systems, which leads to lower radiation dose rates for plant personnel (ALARA), (2) improving fuel inspectability, and (3) reducing potential for spread of radioactive contamination during fuel transport, storage, and reprocessing.

Electrical generation at power plants is routinely interrupted to perform certain tasks that cannot be performed online, such as certain maintenance tasks, inspections, and reactor refueling. During the refueling of a main reactor, the fuel assemblies are removed from the reactor core and stored underwater near the reactor or in the plant's spent fuel pool. Later in the outage, some of the irradiated fuel assemblies are put back into the reactor core, while others are left in the spent fuel pool so that fresh assemblies can be loaded in their place. Existing ultrasonic fuel cleaning systems operate in the window when the fuel assemblies are in the spent fuel pool and available for cleaning. Because fuel offload is generally performed during critical path outage time, it has been more economical to offload fuel first, then go back and clean it after the offload is complete.

Efforts by owners and operators of power plants to reduce outage lengths are resulting in a reduced amount of time available for cleaning fuel assemblies for those plants which perform a full core offload as part of refueling. Furthermore, it has become standard practice in the boiling water reactor (BWR) community to keep a significant percentage of the fuel in the reactor vessel throughout the refueling outage, in practice known as "fuel shuffling." It would be beneficial if a fuel cleaning system were capable of cleaning fuel assemblies during the fuel movements without a significant impact on the time required to move (shuffle or offload) fuel. Such is the case with the invention presented herein.

OBJECTS OF THE INVENTION

It is an object of the present invention to provide a passive system for operating two or more cleaning chambers using a single filtration system.

It is another object of the present invention to provide a passive system having a simple flow diverter assembly for switching filtration and cooling flow between cleaners without the need for underwater actuators.

It is another object of the present invention to provide a system having a flow diverter assembly that requires no user intervention and that is completely passive.

It is another object of the present invention to provide a passive system having a flow diverter assembly that protects the suction pumps from cavitating.

It is another object of the present invention to provide a passive system having a flow diverter assembly that opens slightly to allow some bypass flow when both cleaners are empty.

It is yet another object of the present invention to provide a passive system having a flow diverter assembly that permits fast insertion and removal of fuel assemblies.

It is another object of the present invention to provide a passive system having a flow diverter assembly whereby pistoning forces are reduced by providing a flow path from the bottom of the cleaner to the pool during fuel assembly insertion and removal.

It is another object of the present invention to provide a passive system having a flow diverter assembly that is designed to be field removable/replaceable.

It is yet another object of the present invention to provide a flow diverter assembly using materials that minimize the possibility of galling on sliding parts.

SUMMARY OF THE INVENTION

In response to the foregoing challenges, applicants have developed a series of improvements to existing ultrasonic fuel cleaning technology that increase throughput, usability, serviceability, and speed of mobilization and demobilization, thereby making it possible to clean fuel concurrently with fuel offload or fuel shuffle without significant impact to critical path.

Previously, to increase fuel cleaning throughput, a power plant could install additional ultrasonic cleaning systems. Each of the cleaners would be designed such that the fuel assembly could be fully supported by the cleaner, freeing the fuel handling devices to retrieve additional fuel assemblies rather than waiting for the cleaner to finish before retrieving the next fuel assembly. Alternatively, a plant could avoid the added expense of multiple filtration systems by installing two cleaners and a single filtration system that is switched between the cleaners as necessary. Pneumatic or electronically actuated valves would control suction from the filtration system ensuring that each, cleaner received sufficient flow to flush the loosened crud from the fuel assemblies. Such a solution is less than desirable because it requires underwater actuators and active control of the valves.

This invention provides a passive means for operating two or more cleaning chambers connected via a common header hose to a single filtration system. Each cleaning chamber has a flow diverter assembly upstream of the header hose. The flow diverter assembly is actuated by a fuel assembly when a fuel assembly is inserted into the cleaning chamber. The flow diverter acts so that each cleaning chamber is supplied with flow whenever there is a fuel assembly in the cleaning chamber. When a cleaning chamber is empty, the flow diverter acts to block the suction flow from the filtration system, forcing suction flow through the opposite cleaning chamber. When both cleaning chambers are empty, suction pressure from the pump increases to the point that the flow diverters in both chambers open sufficiently to maintain flow through the pumps and prevent the pumps from cavitating.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 3:
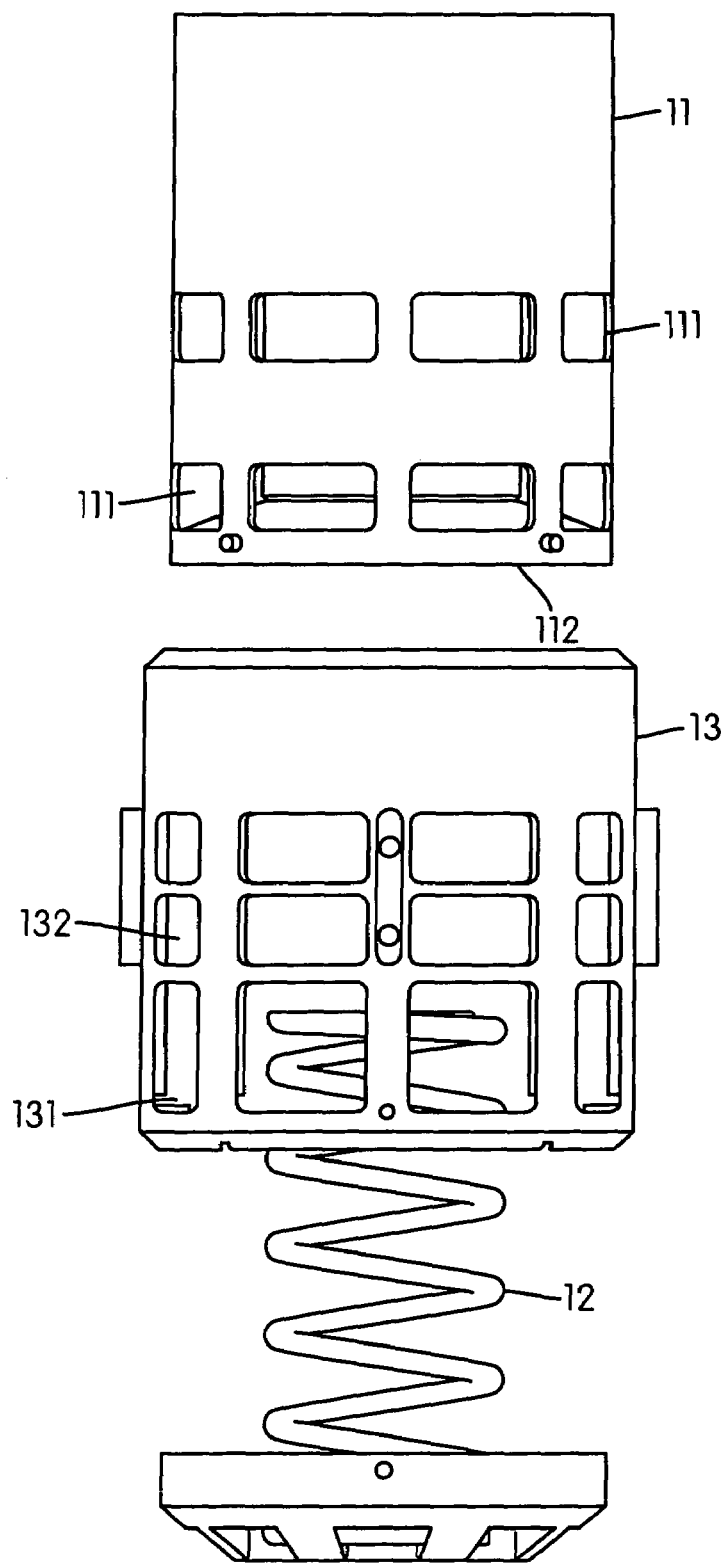
FIG. 3 is an exploded schematic view of the flow diverter assembly of the present invention.
Figure 5:
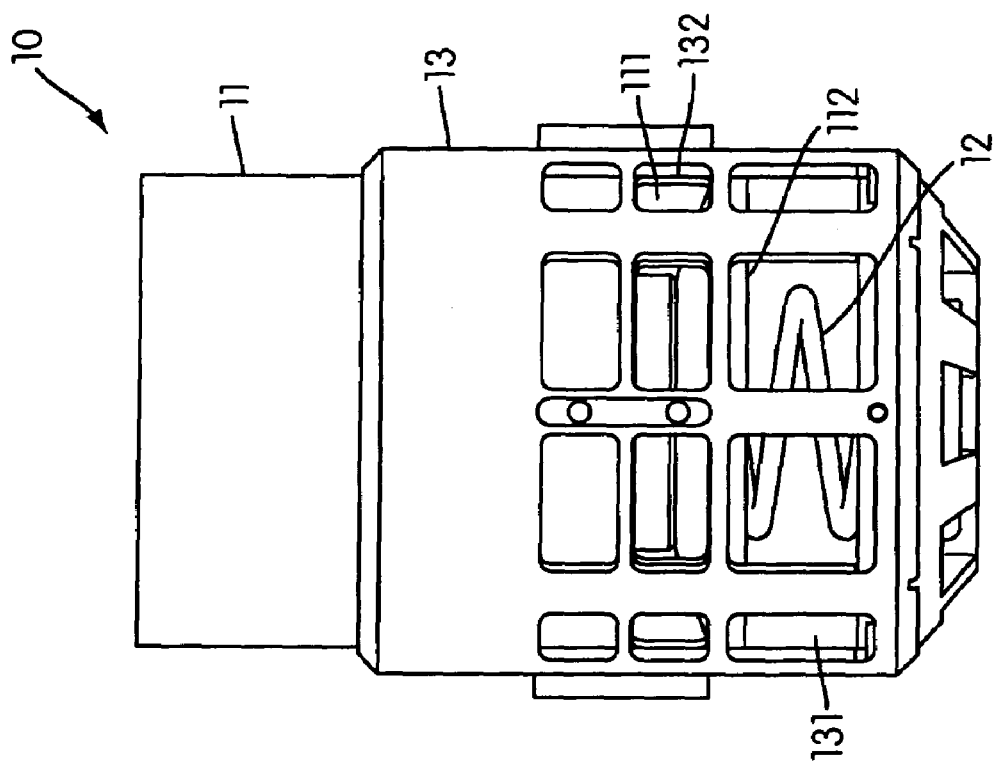
FIG. 5 is a schematic view of the flow diverter assembly of the present invention in the bypass position, whereby the flow through the pool windows is open and the flow through the suction windows is closed.
Figure 4:
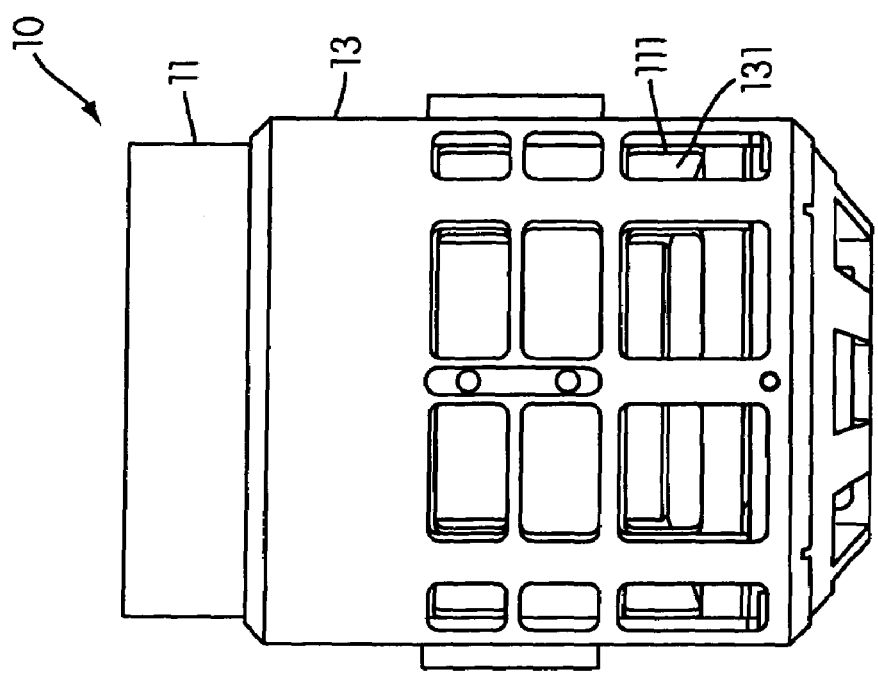
FIG. 4 is a schematic view of the flow diverter assembly of the present invention in the engaged position, whereby the flow through the suction windows is open and the flow through the pool windows is closed.

A flow diverter assembly 10 in accordance with the present invention is illustrated in FIGS. 3–5. The flow diverter assembly 10 is located within an ultrasonic cleaning assembly 1. The flow diverter assembly 10 includes an inner movable piece 11 having a plurality of windows 111 formed thereon. The inner movable piece 11 is preferably formed from steel, such as 304 Stainless Steel. The windows 111 form a flow path. The movable piece 11 is supported by a spring assembly 12. The spring assembly 12 is capable of providing between 100–150 pounds of upward force on the movable piece 11. (It is contemplated that this force may be selected to be as high as practical while staying below the load cell trip points, typically about 10% of the weight of a fuel assembly, on the fuel handling equipment.) The flow diverter 10 further includes a fixed outer member 13. The fixed outer member 13 is preferably formed from Nitronic 60. The fixed outer member 13 includes a plurality of suction windows 131 and a plurality of pool windows 132. When in an engaged position, the suction windows 131 connect the ultrasonic cleaning chamber assembly 1 to the filter pumps (not shown), which are isolated from the cleaning chamber assembly 1. When in a bypass position, the pool windows 132 connect the ultrasonic cleaning chamber assembly 1 to a fuel pool (not shown). The movable piece 11 and the fixed outer piece 13 are made of materials specifically selected to prevent galling while the parts slide against each other.

Figure 1:
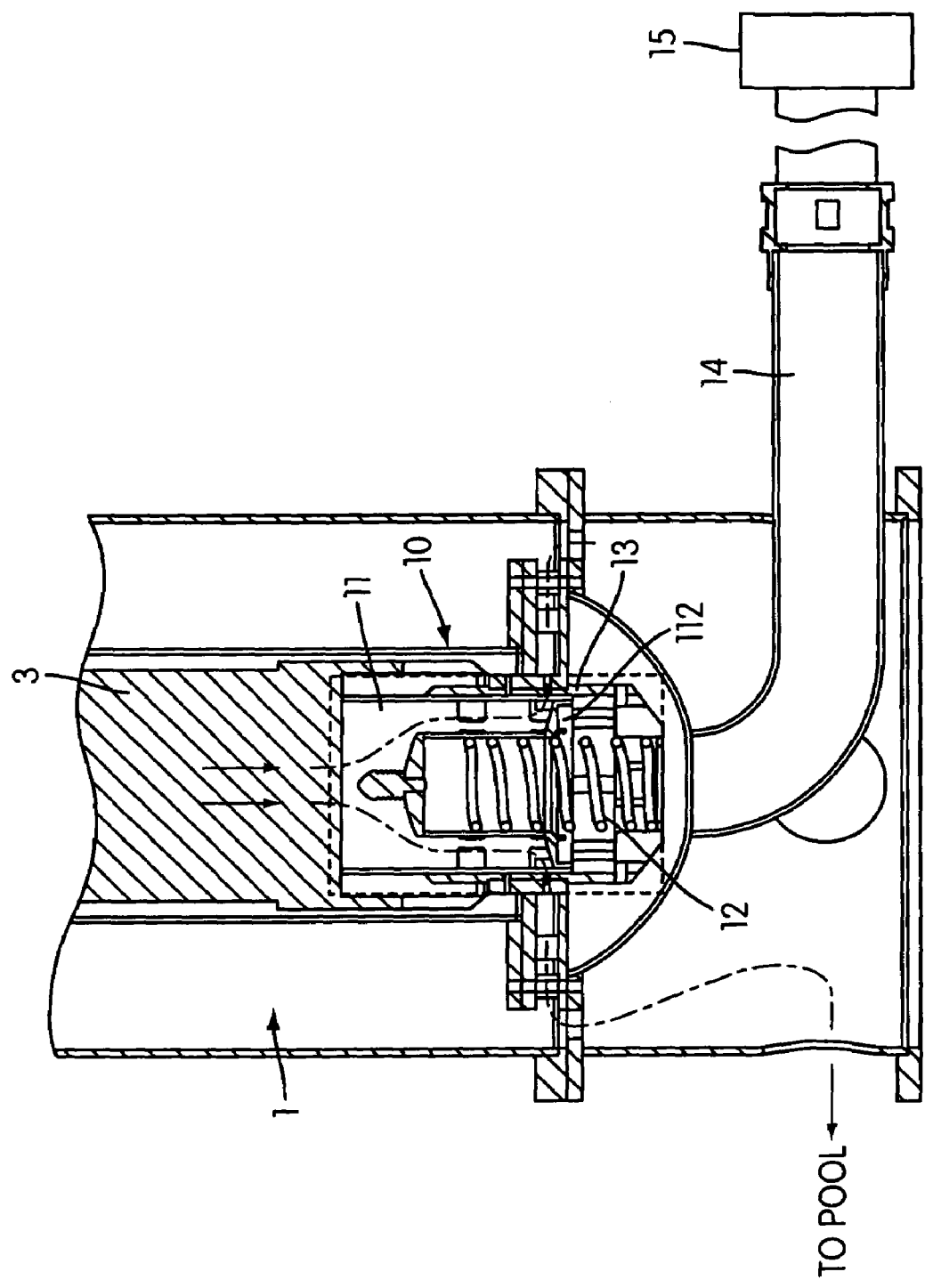
FIG. 1 is a schematic view of a flow diverter assembly located within an ultrasonic cleaning chamber in accordance with the present invention, wherein the flow diverter assembly is in a bypass position such that the filter pumps are isolated from the ultrasonic cleaning chamber, in such a bypass position any hydraulically induced flow in the cleaning chamber is bypassed to and from the fuel pool.
Figure 2:
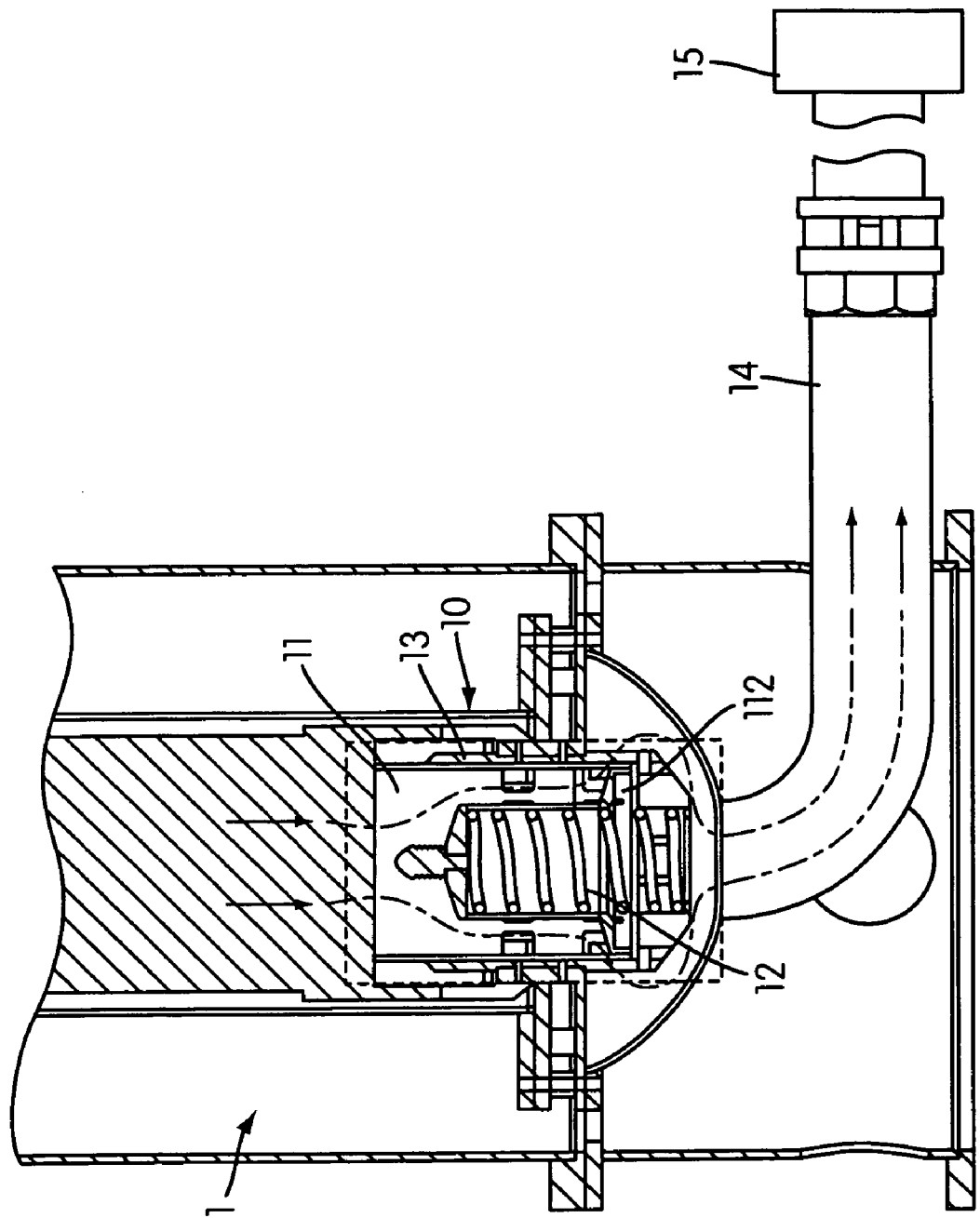
FIG. 2 is a schematic view of the flow diverter assembly of FIG. 1 located in an ultrasonic cleaning chamber, wherein the flow diverter assembly is in an engaged position such that the filter pumps are aligned with the ultrasonic cleaning chamber in such an engaged position, the bypass to the pool is closed.

As illustrated in FIGS. 1 and 2, the flow diverter assembly 10 is located within the ultrasonic cleaning chamber assembly 1. As a fuel assembly 3 is lowered into the cleaning chamber 1, the fuel assembly 3 engages the movable piece 11 of the flow diverter assembly 10. The fuel assembly 3 applies a downward force on the movable piece 11 such that movable piece 11 moves in a downward direction against the bias of the spring assembly 12 from a bypass position, shown in FIG. 1, to an engaged position, shown in FIG. 2. Each cleaning chamber 1 includes at least one bank of ultrasonic transducers (not shown). The cleaning chamber 1 and a filtration system 15 may be portable so that it can be located in the field in the spent fuel pool or in the reactor near the fuel assemblies.

When the movable piece 11 is in the bypass position, the windows 111 are aligned with the pool windows 132 on the fixed outer piece 13. A flow path is created between the ultrasonic cleaning chamber 1 and the fuel pool, as shown in FIG. 1. The movable piece 11 includes a solid lower portion 112, which blocks a flow path to the suction windows 131. In the bypass position, there is no flow path to the suction line 14 and the filtration system 15.

Once the movable piece 11 is pushed to the engaged position by the fuel assembly 3, the windows 111 on the movable piece are aligned with the suction windows 132 on the fixed outer piece 13. The flow path to the pool is closed off and a new flow path to the suction line 14 opens, as shown in FIG. 2, such that a flow path to the filtration system 15 is opened. The filtration system 15 may include a pump 151 and one or more filters 152 having replaceable filter cartridges. When a fuel assembly 3 is positioned within the cleaning chamber 1 such that the flow path to the filtration system 15 is open, as shown in FIG. 2, the pump 151 withdraws water from the chamber 1 through the suction windows 131. The water flows into the filters 152 whereby the crud deposits are separated from the water.

Figure 6:
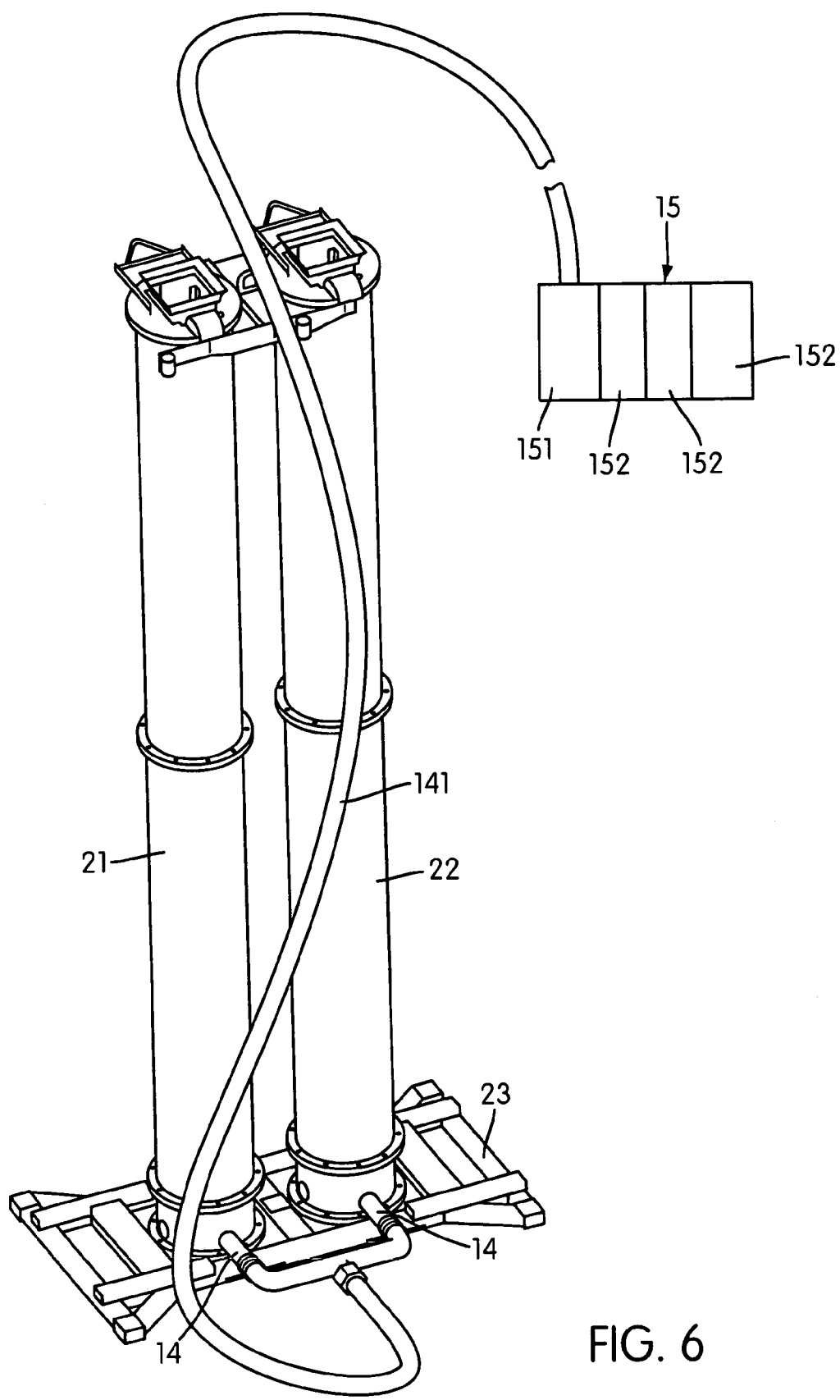
FIG. 6 is a schematic view of an ultrasonic cleaning assembly with two ultrasonic cleaning chambers.

FIG. 6 shows an assembly with two cleaning chambers 21 and 22. Each chamber 21 and 22 has a suction line 14 operatively connected to the diverter assembly 10, as shown in FIGS. 1 and 2. The suction lines 14 are connected such that a single suction line 141 extends from the chambers 21 and 22 to the filtration assembly 15. It is contemplated that two or more cleaning chambers can be operatively connected to the suction line 141 and the single filtration system 15. In the event that the flow diverters in both cleaning chambers are in the bypass configuration (i.e., both cleaning chambers are empty (e.g., FIGS. 1 and 5)), the pressure difference between the common suction line and the pool will become great enough to overcome the spring force of the spring assembly 12 for keeping the movable piece 11 of at least one of the cleaning chambers in the bypass position. In that case, the corresponding flow diverter 10 will move down, allowing some flow to the common suction line 141. The suction line 141 is preferably a flexible hose, but rigid piping is considered to be well within the scope of the present invention. This maintains a safe minimum net positive suction head (NPSH) that prevents the suction pumps from cavitating.

In accordance with the present invention, it is contemplated that one or more ultrasonic cleaning chambers 1 having a diverter assembly 10 may be employed, such as a pair of cleaning chambers 21 and 22 shown in FIG. 6. The chambers 21 and 22 have the same construction as the chamber 1 illustrated in FIGS. 1 and 2. The chambers 21 and 22 are mounted on a base plate 23 that may be located in the fuel pool when cleaning is desired. When a cleaning chamber 21 is empty, the flow diverter assembly 10 acts to block the suction flow from the filtration system 15, forcing suction flow through the opposite cleaning chamber 22. The flow diverter assembly 10 only provides suction to a cleaning chamber 21 or 22 when there is a fuel assembly 3 in the cleaning chamber, as shown in FIG. 2.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. While the diverter assembly 10 has been described in connection with an ultrasonic cleaner, it is contemplated that the diverter assembly 10 can be used in other cleaning devices. Furthermore, it is contemplated that the diverter assembly 10 may be used in other applications outside of cleaning, where it is desirable to provide passive flow control. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. An ultrasonic cleaner assembly for irradiated nuclear fuel assemblies, comprising:
   a housing assembly for receiving a fuel assembly, wherein the housing assembly contains a fluid therein and at least one ultrasonic transducer;
   a filter and pump assembly for withdrawing and filtering the fluid from the housing assembly at predetermined times; and
   a flow diverter assembly operatively connected to the housing assembly for switching a flow path between a fuel pool and a suction line to the filter and pump assembly, wherein the flow diverter assembly establishes a flow path with a fuel pool when in a by-pass position, and wherein the flow diverter assembly establishes a flow path with the suction line to the filter and pump assembly when in an engaged position,
   wherein the flow diverter assembly comprises a spring biased movable member that is movable between the by-pass position and the engaged position.

2. The ultrasonic cleaner assembly according to claim 1, wherein the flow diverter assembly comprises a fixed member, and wherein the movable member is movable relative to the fixed member between the by-pass position and the engaged position.

3. The ultrasonic cleaner assembly according to claim 2, wherein the spring biased movable member moves from the by-pass position to the engaged position in response to a force applied by the fuel assembly.

4. The ultrasonic cleaner assembly according to claim 1, wherein the flow diverter assembly opens slightly to allow some bypass flow when the housing assembly is empty.

5. The ultrasonic cleaner assembly according to claim 2, wherein the fixed member has at least one by-pass position window formed therein and at least one engaged position window formed therein,
   wherein the spring biased movable member has at least one window formed therein, and
   wherein the at least one window is aligned with the at least one by-pass position window when the movable member is in the by-pass position and the at least one window is aligned with the at least one engaged position window when the movable member is in the engaged position.

6. The ultrasonic cleaner assembly according to claim 1, wherein the flow diverter assembly is positioned within the housing assembly.

7. The ultrasonic cleaner assembly according to claim 1, wherein the flow path with the fuel pool is closed when the flow diverter assembly is in the engaged position.

8. The ultrasonic cleaner assembly according to claim 1, wherein the flow path with the suction line to the filter and pump assembly is closed when the flow diverter assembly is in the by-pass position.

9. An ultrasonic cleaner assembly comprising:
   a first housing assembly for receiving a first fuel assembly, wherein the first housing assembly contains a fluid and at least one ultrasonic transducer;
   a second housing assembly for receiving a second fuel assembly, wherein the second housing assembly contains the fluid and at least one ultrasonic transducer;
   a filter and pump assembly for withdrawing and filtering the fluid from at least one of the first housing assembly and the second housing assembly at predetermined times;
   a first flow diverter assembly operatively connected to the first housing assembly for switching a flow path between a fuel pool when in a by-pass position and a suction line to the filter and pump assembly when in an engaged position; and
   a second flow diverter assembly operatively connected to the second housing assembly for switching a flow path between the fuel pool when in a by-pass position and the suction line to the filter and pump assembly when in an engaged position,
   wherein each flow diverter assembly comprises a spring biased movable member that is movable between the by-pass position and the engaged position.

10. The ultrasonic cleaner assembly according to claim 9, wherein each flow diverter assembly comprises a fixed member, and wherein each movable member is movable relative to the associated fixed member between the by-pass position and the engaged position.

11. The ultrasonic cleaner assembly according to claim 10, wherein each spring biased movable member moves from the by-pass position to the engaged position in response to a force applied by the corresponding fuel assembly.

12. The ultrasonic cleaner assembly according to claim 11, wherein both flow diverter assemblies open slightly to allow some bypass flow when both housing assemblies are empty.

13. The ultrasonic cleaner assembly according to claim 10, wherein both flow diverter assemblies open slightly to allow some bypass flow when both housing assemblies are empty.

14. The ultrasonic cleaner assembly according to claim 10, wherein the fixed member has at least one by-pass position window formed therein and at least one engaged position window formed therein,
wherein the spring biased movable member has at least one window formed therein, and
wherein the at least one window is aligned with the at least one by-pass position window when the movable member is in the by-pass position and the at least one window is aligned with the at least one engaged position window when the movable member is in the engaged position.

15. The ultrasonic cleaner assembly according to claim 14, wherein the first flow diverter assembly is positioned within the first housing assembly and the second flow diverter assembly is positioned within the second housing assembly.

16. The ultrasonic cleaner assembly according to claim 9, wherein both flow diverter assemblies open slightly to allow some bypass flow when both housing assemblies are empty.

17. The ultrasonic cleaner assembly according to claim 9, wherein the first flow diverter assembly closes the flow path between the first housing assembly and the fuel pool when the first flow diverter assembly is in the engaged position.

18. The ultrasonic cleaner assembly according to claim 9, wherein the first flow diverter assembly closes the flow path between the first housing assembly and the suction line to the filter and pump assembly when the first flow diverter assembly is in the by-pass position.

19. A flow diverter assembly comprising:
a fixed outer member, wherein the fixed outer member has at least one by-pass position window formed therein and at least one engaged position window formed therein;
a spring biased movable member having at least one window formed therein, wherein the movable member is movable within the fixed outer member between a by-pass position and an engaged position, wherein the movable member moves between the by-pass position and the engaged position in response to application of a load on the movable member,
wherein the at least one window is aligned with the at least one by-pass position window when the movable member is in the by-pass position and the at least one window is aligned with the at least one engaged position window when the movable member is in the engaged position.

20. The flow diverter assembly according to claim 19, wherein the spring biased movable member moves from the by-pass position to the engaged position in response to locating an object on the movable member.

21. An ultrasonic cleaner assembly for irradiated nuclear fuel assemblies, comprising:
a first housing assembly constructed and arranged to house an irradiated nuclear fuel assembly and contain a fluid therein;
a first ultrasonic transducer disposed within the first housing assembly;
a filter and pump assembly fluidly connected to the first housing assembly by a first fluid flow path, the filter and pump assembly being constructed and arranged to withdraw and filter the fluid from the first housing assembly;
a flow diverter assembly comprising a first movable member that is movable between first and second positions, the first movable member permitting less fluid flow through the first fluid flow path when in the first position than when in the second position, the first movable member being spring biased toward its first position, the first movable member being constructed and arranged to move to the second position in response to a force applied by the irradiated nuclear fuel assembly.

22. The ultrasonic cleaner assembly of claim 21, further comprising a second fluid flow path between the first housing assembly and an environment surrounding the housing assembly, the first movable member closing the second fluid flow path when in the second position and permitting fluid flow through the second fluid flow path when in the first position.

23. The ultrasonic cleaner assembly of claim 21,
wherein the first movable member closes the first fluid path when in the first position.

24. The ultrasonic cleaner assembly of claim 23, wherein:
when the first housing assembly does not house the irradiated nuclear fuel assembly, the first movable member is constructed and arranged to move to a third position in response to operation of the filter and pump assembly, the first movable member permits some fluid flow through the first fluid path when in the third position, and
the first movable member permits less fluid flow through the first fluid flow path when in the third position than when in the second position.

25. The ultrasonic cleaner assembly of claim 21, further comprising:
a second housing assembly constructed and arranged to house an irradiated nuclear fuel assembly and contain the fluid therein;
a second ultrasonic transducer positioned relative to the second housing assembly to clean the irradiated nuclear fuel assembly housed by the second housing assembly, a second fluid flow path fluidly connecting the second housing assembly to the filter and pump assembly; and
a second movable member that is movable between third and fourth positions, the second movable member permitting less fluid flow through the second fluid flow path when in the third position than when in the fourth position.

26. The ultrasonic cleaner assembly of claim 25, wherein:
the ultrasonic cleaner assembly further comprises a common suction line operatively connected to the filter and pump assembly;
the first and second fluid flow paths extend through the common suction line;
the second movable member is biased toward its third position; and
the second movable member is constructed and arranged to move to the fourth position in response to a force applied by the irradiated nuclear fuel assembly being placed in the second housing assembly.

* * * * *